(12) United States Patent
Tucker et al.

(10) Patent No.: US 12,210,515 B1
(45) Date of Patent: Jan. 28, 2025

(54) CONFIGURABLE BATCH PROCESSING USING A DECOUPLED RULE DATABASE

(71) Applicant: State Farm Mutual Automobile Insurance Company, Bloomington, IL (US)

(72) Inventors: Bruce Tucker, Heyworth, IL (US); Nate Shepherd, Bloomington, IL (US); Tony Buchberger, Normal, IL (US); Jake Carlson, Hudson, IL (US); Hillary Mclaurin, Dallas, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/428,869

(22) Filed: Jan. 31, 2024

(51) Int. Cl.
*G06F 16/23* (2019.01)
*G06F 16/2455* (2019.01)

(52) U.S. Cl.
CPC ...... *G06F 16/2386* (2019.01); *G06F 16/2358* (2019.01); *G06F 16/24564* (2019.01)

(58) Field of Classification Search
CPC ............. G06F 16/2358; G06F 16/2379; G06F 16/2386; G06F 16/24564; G06F 16/24565
See application file for complete search history.

(56) References Cited

U.S. PATENT DOCUMENTS

| | | | |
|---|---|---|---|
| 7,392,320 B2 | 6/2008 | Bookman | |
| 7,546,287 B2 | 6/2009 | Subramaniam | |
| 7,856,434 B2 | 12/2010 | Gluzman Peregrine | |
| 9,003,402 B1 | 4/2015 | Carbone | |
| 2003/0004840 A1* | 1/2003 | Gharavy | G06Q 30/018 705/30 |
| 2014/0280248 A1* | 9/2014 | Bester | G06F 16/9535 707/754 |
| 2015/0193474 A1* | 7/2015 | Deng | G06F 16/24564 707/694 |
| 2017/0154067 A1* | 6/2017 | Hazlewood | G06F 16/2365 |
| 2018/0219830 A1* | 8/2018 | O'Brien | H04L 61/5007 |
| 2021/0288970 A1* | 9/2021 | Chawla | H04L 67/55 |

\* cited by examiner

*Primary Examiner* — James E Richardson
(74) *Attorney, Agent, or Firm* — Lee & Hayes, P.C.

(57) ABSTRACT

This disclosure describes techniques for performing batch processing using a custom batch processing routine (e.g., a custom filtering routine) that calls a native batch processing routine (e.g., a native filtering routine) associated with a batch processing system as well as a rule database for one or more additional filtering rules. In some cases, a custom filtering routine may be configured to: (i) receive a batch of data, (ii) call a native filtering routine to process the received batch data, and (iii) apply one or more additional filtering operations on the output of the native filtering routine. For example, the custom filtering routine may be configured to: (i) make a query to the rule database to extract one or more filtering rules, and (ii) apply the extracted filtering rules to the output of the native filtering routine to perform the additional filtering operations.

20 Claims, 5 Drawing Sheets

CONFIGURABLE BATCH PROCESSING USING A DECOUPLED RULE DATABASE

TECHNICAL FIELD

The present disclosure relates to batch processing systems, and more particularly to techniques for performing configurable filtering and/or processing in batch processing systems.

BACKGROUND

Many computing systems are configured to process large batches of data. Such batch processing may involve executing workflows with multiple steps like filtering data records and processing filtered data records. Traditionally, many batch processing workflows have been defined programmatically with codebases that explicitly implement all the required processing logic.

However, hardcoded batch processing workflows suffer from many drawbacks. For example, hardcoded batch processing workflows may be inflexible and burdensome to maintain. Furthermore, hardcoded batch processing workflows may have drawbacks in terms of reusability and/or scalability. Moreover, maintaining hardcoded batch processing workflows may be computationally resource intensive.

Examples of the techniques described in the present disclosure are directed to overcoming the challenges and needs described above.

SUMMARY

In some examples, the techniques described herein relate to a computer-implemented method, including, at a first time, receiving, by a processor, a first request to update configuration data defining a batch processing workflow of a batch processing system, wherein the configuration data requires processing a first output of a first filtering routine using a first processing routine. The method further includes, based on receiving the first request, updating, by the processor, the configuration data to override the first filtering routine with a second filtering routine that is configured to: intercept a first input of the first filtering routine, provide the first input to the first filtering routine, receive, from the first filtering routine, the first output of the first filtering routine; receive, from a first database that is external to the batch processing system, a filtering rule, and determine a second output of the second filtering routine based on a applying the filtering rule to the first output. The method further includes, at a second time, receiving, by the processor, a second request to execute the batch processing workflow. The method further includes, based on receiving the second request, providing, by the processor, a first dataset stored on a second database as the first input to the second filtering routine. The method further includes receiving, by the processor and from the second filtering routine, a second dataset stored on the second database as the second output. The method further includes executing, by the processor, the first processing routine on the second dataset to determine a batch processing result data of the first processing routine. The method further includes updating, by the processor, the second database based on the batch processing result data.

In additional examples, the techniques described herein relate to a computing system, including: a processor; and memory storing computer-executable instructions that, when executed by the processor, cause the computing system to perform operations including, at a first time, receiving a first request to update configuration data defining a batch processing workflow of a batch processing system, wherein the configuration data requires processing a first output of a first filtering routine using a first processing routine. The operations further include, based on receiving the first request, updating the configuration data to override the first filtering routine with a second filtering routine that is configured to: intercept a first input of the first filtering routine, provide the first input to the first filtering routine, receive, from the first filtering routine, the first output of the first filtering routine; receive, from a first database that is external to the batch processing system, a filtering rule, and determine a second output of the second filtering routine based on a applying the filtering rule to the first output. The operations further include, at a second time, receiving a second request to execute the batch processing workflow. The operations further include, based on receiving the second request, providing a first dataset stored on a second database as the first input to the second filtering routine. The operations further include receiving, from the second filtering routine, a second dataset stored on the second database as the second output. The operations further include executing the first processing routine on the second dataset to determine a batch processing result data of the first processing routine. The operations further include updating the second database based on the batch processing result data.

In further examples, the techniques described herein relate to one or more non-transitory computer-readable media storing computer-executable instructions that, when executed by the processor, cause the one or more processors to perform operations, including, at a first time, receiving a first request to update configuration data defining a batch processing workflow of a batch processing system, wherein the configuration data requires processing a first output of a first filtering routine using a first processing routine. The operations further include, based on receiving the first request, updating the configuration data to override the first filtering routine with a second filtering routine that is configured to: intercept a first input of the first filtering routine, provide the first input to the first filtering routine, receive, from the first filtering routine, the first output of the first filtering routine; receive, from a first database that is external to the batch processing system, a filtering rule, and determine a second output of the second filtering routine based on a applying the filtering rule to the first output. The operations further include, at a second time, receiving a second request to execute the batch processing workflow. The operations further include, based on receiving the second request, providing a first dataset stored on a second database as the first input to the second filtering routine. The operations further include receiving, from the second filtering routine, a second dataset stored on the second database as the second output. The operations further include executing the first processing routine on the second dataset to determine a batch processing result data of the first processing routine. The operations further include updating the second database based on the batch processing result data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for performing batch processing using a custom batch processing routine (e.g., a custom filtering routine) that calls a native batch processing routine (e.g., a native filtering routine) associated with a batch processing system as well as a rule database for one or more additional filtering rules. In some cases, a custom filtering routine may be configured to: (i) receive a batch of data, (ii) call a native filtering routine to process the received batch data, and (iii) apply one or more additional filtering operations on the output of the native filtering routine. For example, the custom filtering routine may be configured to: (i) make a query to the rule database to extract one or more filtering rules, and (ii) apply the extracted filtering rules to the output of the native filtering routine to perform the additional filtering operations. In some cases, the database call to the rule database decouples identification of additional filtering rules from the in-scope code of the custom configuration routine, such that the operational logic of the custom configuration routine may be changed without changing the in-scope code of the custom configuration routine. This decoupling enables changing the behavior of the configuration data associated with the batch processing system without changing the underlying code of the configuration data, which may in turn reduce or remove the need to update the codebase of the configuration data and/or to deploy updated codebase to the configuration data. In this way, the techniques described herein may reduce the computational requirements associated with updating and/or maintenance of the configuration data associated with the batch processing system.

Figure 1:
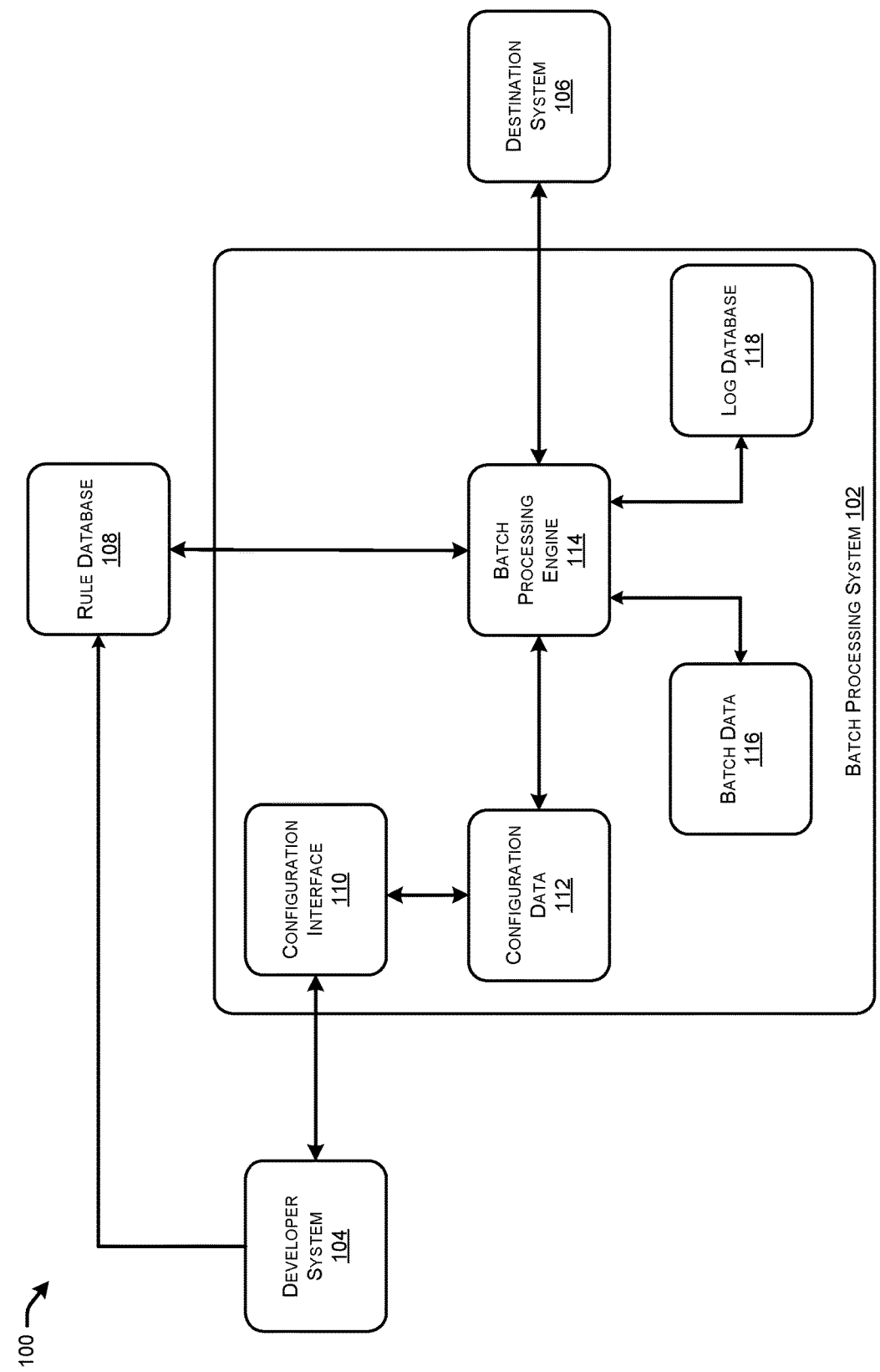
FIG. 1 provides an example environment for performing batch processing using a decoupled rule database.

FIG. 1 provides an example environment 100 for performing batch processing using a decoupled rule database. As depicted in FIG. 1, environment 100 includes a batch processing system 102, a developer system 104, a destination system 106, and a rule database 108 (e.g., a rule database that is external to the batch processing system 102). As further depicted in FIG. 1, the batch processing system 102 includes a configuration interface 110, configuration data 112, a batch processing engine 114, batch data 116, and a log database 118.

The batch processing system 102 may be configured to perform operations associated with one or more batch processing workflows based on configuration data 112 defined based at least in part on input data provided by the developer system 104. In some cases, the developer system 104 is configured to modify the configuration data 112 associated with the batch processing system 102 using the configuration interface 110. For example, the developer system 104 may be configured to modify at least one of a filtering class, a filtering routine, a processing class, or a processing routine associated with the batch processing system 102 using the configuration interface 110.

The configuration data 112 associated with the batch processing system 102 may define a native filtering routine and a native processing routine. The native filtering routine may be configured to: (i) receive at least a subset of the batch data 116, (ii) process the received batch data using a set of in-scope filtering operations associated with the native filtering routine to generate a selected subset of the received batch data 116, and (iii) provide the selected subset to the native processing routine. The native processing routine may be configured to perform one or more batch processing operations on the selected subset received from the native filtering routine.

For example, the native filtering routine may be configured to perform a filtering operation to determine a selected subset of insurance policy records that are associated with a particular jurisdiction (e.g., a particular jurisdiction) and the native processing routine may be configured to validate that all of the insurance policy records in the selected subset (e.g., all of the insurance policy records associated with the particular jurisdiction) abide by one or more compliance requirements associated with the particular jurisdiction.

As another example, the native filtering routine may be configured to perform a filtering operation to determine a selected subset of customer records that have made a purchase within the last 30 days and the native processing routine may be configured to send a targeted email advertisement to each customer in the selected subset.

As another example, the native filtering routine may be configured to perform a filtering operation to determine a selected subset of financial transaction records that are over a threshold dollar amount and the native processing routine may be configured to flag those transactions for manual review as potentially involving fraudulent activity.

As another example, the native filtering routine may be configured to determine a selected subset of sensor data that was generated during a specific period and the native processing routine may be configured to analyze trends and patterns in that selected subset of sensor data.

As another example, the native filtering routine may be configured to determine a selected subset of log records that contain specific keywords or error codes, and the native processing routine may be configured to aggregate and/or summarize those logs to identify recurring issues.

In some cases, the native filtering routine and the native processing routine may be associated with corresponding routine signatures in an interface data structure defined by the configuration data 112. For example, configuration data 112 may define an interface data structure with one or more routine signatures. In some examples such routine signatures may include a first routine signature associated with the native filtering routine and a second routine signature associated with the native processing routine. In some cases, an interface data structure is a programming construct in an object-oriented programming language that defines properties for one or more routines (e.g., methods) for a class data structure to implement. The interface data structure may define, for each defined routine, a routine signature that defines one or more features associated with defined routine (e.g., one or more of a routine name, one or more input parameters of the routine, and/or a return type of the routine). In some cases, a class data structure can implement an interface data structure by providing, for each routine signature defined by the interface data structure, a routine that defines the operational logic for the respective routine signature. This may enable multiple implementations of the same routine signature schema defined by an interface data structure.

The native filtering routine and the native processing routine may be defined by corresponding routines in a class data structure. A class data structure may be a programming construct in an object-oriented programming language that defines one or more routines and/or one or more data fields. A programmer may instantiate a class data structure (e.g., by creating a class instance and running a constructor routine associated with the class instance) and use the class instance to execute the routines associated with the class instance on the data associated with the class instance. In some cases, the configuration data 112 may define a class data structure with two routines: the native filtering routine and the native processing routine.

In some cases, the configuration data 112 defines: (i) an interface data structure with a first routine signature (e.g., associated with the native filtering routine) and a second routine signature (e.g., associated with the native processing routine), and (ii) a class data structure that implements the interface data structure. The class data structure may define the first routine signature using a first routine (e.g., the native filtering routine) and the second routine signature using a second routine (e.g., the native processing routine). The class data structure may be an abstract class data structure. An abstract class data structure, in object-oriented programming, may refer to a class data structure that cannot be instantiated but can be used to define one or more sub-class data structures via inheritance. A routine defined by an abstract class data structure may define a common routine signature and/or a common behavior for the corresponding routine all the sub-class data structures that inherit from the abstract class data structure.

The developer system 104 may be configured to modify the configuration data 112 by overriding at least one of the native filtering routine or the native processing routine defined by the configuration data. For example, the developer system 104 may override the native filtering routine with a custom filtering routine that calls the native filtering routine. As another example, the developer system 104 may override the native processing routine with a custom processing routine that calls the custom processing routine. In some cases, when a method overrides another method, the overriding method intercepts the method calls of the overridden method.

In some cases, to override the native filtering routine with a custom filtering routine, the developer system 104 may (e.g., using the configuration interface 110) modify the configuration data 112 to define a subclass data structure that inherits a class data structure (e.g., an abstract class data structure) with the native filtering routine. The subclass data structure may override the native filtering routine with the custom filtering routine. The custom filtering routine may be configured to: (i) receive at least a subset of the batch data 116, (ii) call the native filtering routine (e.g., using the super keyword) to process the received batch data 116, and (iii) apply one or more additional filtering operations on the output of the native filtering routine. For example, the custom filtering routine may be configured to: (i) make a query to the rule database 108 to extract one or more filtering rules, and (ii) apply the extracted filtering rules to the output of the native filtering routine to perform the additional filtering operations.

In some cases, to override the native filtering routine with a custom filtering routine, the developer system 104 may (e.g., using the configuration interface 110) modify the configuration data 112 to define a class data structure that implements an interface data structure. The interface data structure may define a first routine signature that is implemented via another class data structure, where the other class data structure may implement the first routine signature using the native filtering routine. The class data structure may implement the first routine signature using the custom filtering routine. The custom filtering routine may be configured to: (i) receive at least a subset of the batch data 116, (ii) call the native filtering routine (e.g., using the super keyword) to process the received batch data 116, and (iii) apply one or more additional filtering operations on the output of the native filtering routine. For example, the custom filtering routine may be configured to: (i) make a query to the rule database 108 to extract one or more filtering rules, and (ii) apply the extracted filtering rules to the output of the native filtering routine to perform the additional filtering operations.

In some cases, to override the native processing routine with a custom processing routine, the developer system 104 may (e.g., using the configuration interface 110) modify the configuration data 112 to define a subclass data structure that inherits a class data structure (e.g., an abstract class data structure) with the native processing routine. The subclass data structure may override the native processing routine with the custom processing routine. The custom processing routine may be configured to: (i) receive input data (e.g., the output of another routine, such as the custom filtering routine), (ii) call the native processing routine to process the received input, and (iii) apply one or more additional processing operations on the output of the native processing routine. For example, the custom filtering routine may be configured to: (i) make a query to the rule database 108 to extract one or more processing rules, and (ii) apply the extracted filtering processing to the output of the native processing routine to perform the additional processing operations.

In some cases, to override the native processing routine with a custom filtering routine, the developer system 104 may (e.g., using the configuration interface 110) modify the configuration data 112 to define a class data structure that implements an interface data structure. The interface data structure may define a first routine signature that is implemented via another class data structure, where the other class data structure may implement the first routine signature using the native processing routine. The class data structure may implement the first routine signature using the custom processing routine. The custom processing routine may be configured to: (i) receive input data (e.g., the output of another routine, such as the custom filtering routine), (ii) call the native processing routine to process the received input, and (iii) apply one or more additional processing operations on the output of the native processing routine. For example, the custom filtering routine may be configured to: (i) make a query to the rule database 108 to extract one or more processing rules, and (ii) apply the extracted filtering processing to the output of the native processing routine to perform the additional processing operations.

As described above, to update the configuration data 112, the developer system 104 may override a native configuration routine (e.g., the native filtering routine or the native processing routine) with a custom configuration routine that makes a call to the rule database 108. This database call decouples definition of additional filtering rules from the in-scope code of the custom configuration routine, such that the operational logic of the custom configuration routine may be changed without changing the in-scope code of the custom configuration routine. This decoupling enables changing the behavior of the configuration data 112 without changing the underlying code of the configuration data 112, which may reduce or remove the need to update the codebase of the configuration data 112 and/or to deploy updated codebase to the configuration data 112. In this way, the techniques described herein may reduce the computational requirements associated with updating and/or maintenance of the batch processing system 102.

For example, in some cases, a custom filtering routine: (i) receives at least a subset of the batch data 116, (ii) call the native filtering routine (e.g., using the super keyword) to process the received batch data 116, (iii) queries the rule database 108 to extract a set of M additional filtering rules, and (iv) apply the M additional filtering rules on the output of the native filtering routine. In this example scenario, the developer system 104 can modify the behavior of the custom filtering routine without changing the code associated with the custom filtering routine by updating the M additional filtering rules (e.g., by adding new rules, removing existing rules, and/or modifying existing rules).

For example, if the M additional filtering rules test whether a data record is associated with one of M relevant jurisdictions (e.g., M relevant states), the developer system 104 can add new jurisdictions to the M relevant jurisdictions, remove existing jurisdictions from the M relevant jurisdictions, and/or modify at least a subset of the M relevant jurisdictions. These updates to the M relevant jurisdictions can affect how the custom filtering routine filters records without any changes to the codebase of the custom filtering routine. Accordingly, the developer system 104 may be able to update the behavior of the custom filtering routine without the need to change the respective codebase of the custom filtering routine and/or without the need to deploy updated codebase onto the configuration data 112 of the batch processing system 102.

As another example, in some cases, a custom processing routine: (i) receives at least a subset of the batch data 116, (ii) call the native filtering routine (e.g., using the super keyword) to process the received batch data 116, (iii) queries the rule database 108 to extract a set of N additional processing rules, and (iv) apply the N additional processing rules on the output of the native processing routine. In this example scenario, the developer system 104 can modify the behavior of the custom processing routine without changing the code associated with the custom processing routine by updating the N additional processing rules (e.g., by adding new rules, removing existing rules, and/or modifying existing rules).

For example, if the N additional processing rules test whether a data record satisfies N relevant compliance standards, the developer system 104 can add new compliance standards to the N relevant compliance standards, remove existing compliance standards from the N relevant compliance standards, and/or modify at least a subset of the N relevant compliance standards. These updates to the N relevant compliance standards can affect how the custom processing routine processes records without any changes to the codebase of the custom processing routine. Accordingly, the developer system 104 may be able to update the behavior of the custom processing routine without the need to change the respective codebase of the custom processing routine and/or without the need to deploy updated codebase onto the configuration data 112 of the batch processing system 102.

Accordingly, as depicted in FIG. 1, the developer system 104 may be able to communicate with the rule database 108 to update the rule database 108. Updating the rule database 108 may include updating one or more filtering rules and/or one or more processing rules stored on the rule database 108. In some cases, the rule database 108 stores, for each of one or more batch processing workflows, a set of filtering rules and/or a set of processing rules. In some cases, the developer system 104 may be configured to update the set of filtering rules and/or the set of processing rules for at least a subset of the batch processing workflows whose respective rules are stored on the rule database 108 (e.g., for all of the batch processing workflows whose respective rules are stored on the rule database 108, for a subset of the batch processing workflows that a developer user profile is authorized to modify, and/or the like).

As further depicted in FIG. 1, the configuration data 112 may be used by the batch processing engine 114 to perform operations associated with one or more batch processing workflows. The configuration data 112 may define one or more batch processing workflows, where each batch processing workflow may be a sequence of operations performed on at least a subset of the batch data 116.

For example, a batch processing workflow may be a sequence of operations that includes: (i) receiving at least a subset of the batch data 116, (ii) processing the received batch data 116 using a filtering routine (e.g., a custom filtering routine defined by the developer system 104 via updating the configuration data 112) to determine a selected subset of the batch data 116 and/or a filtered subset of the batch data 116, and (iii) processing data determined based on the output of the filtering routine using a processing routine (e.g., the native processing routine or a custom processing routine defined by the developer system 104 via updating the configuration data 112). In some cases, a batch processing workflow also includes storing the filtered subset generated by executing the filtering routine in the log database 118. The log database 118 may be internal to the batch processing system 102.

The batch processing engine 114 may be configured to receive a request to perform operations associated with a batch processing workflow from the destination system 106. Based on (e.g., in response to) receiving this request, the batch processing engine 114 may: (i) identify operations associated with the batch processing workflow by querying the configuration data 112, and (ii) perform the identified operations based on data extracted from the batch data 116. In some cases, if the batch processing workflow includes a routine that requires querying the rule database 108 to determine one or more rules (e.g., one or more filtering rules and/or one or more processing rules), the batch processing engine 114 may query the rule database 108 to determine the relevant rules. In some cases, after performing the operations associated with the requested workflow on data extracted from the batch data 116, the batch processing engine 114 may return the output data resulting from the operations to the destination system 106.

For example, the batch processing engine 114 may be configured to receive a request for determining whether car insurance policy records associated with a set of jurisdictions satisfy a set of compliance standards. In response, the batch processing engine 114 may: (i) retrieve insurance policy records from the batch data 116, (ii) process the retrieved records using a native filtering routine to determine car insurance policy records, (iii) query the rule database 108 to retrieve the set of jurisdictions, (iv) process the car insurance policy records to determine the car insurance policy records associated with the retrieved set of jurisdictions, (v) process the car insurance policy records associated with retrieved set of jurisdictions using a processing routine (e.g., a native processing routine or a custom processing routine that makes a call to the native processing routine and/or to the rule database 108) to determine a processing output, and (vi) provide the processing output to the destination system 106. In some cases, the batch processing engine 114 may store an indication of insurance policy records that are not car insurance policy records and/or car insurance policy records that are not associated with the retrieved set of jurisdictions on the log database 118.

As another example, the batch processing engine 114 may be configured to receive a request for generating targeted marketing campaigns for customer records associated with one or more defined demographic segments. In response, the batch processing engine 114 may: (i) retrieve customer records from the batch data 116, (ii) process the records using the native filtering routine to determine the customer records with valid contact information, (iii) query the rule database 108 to retrieve the defined demographic segments, (iv) process the customer records with valid contact information using the defined demographic segments to identify the customer records with the valid contact information that are also associated with the defined demographic segments, (v) process the customer records with the valid contact information that are also associated with the defined demographic segments using a processing routine (e.g., a native processing routine or a custom processing routine that makes a call to the native processing routine and/or to the rule database 108) to determine a processing output, and (vi) provide the processing output to the destination system 106. In some cases, the batch processing engine 114 may store an indication of customer records that are not associated with valid contact information and/or customer records with valid contact information that are not associated with the defined demographic segments on the log database 118.

As another example, the batch processing engine 114 may be configured to receive a request for inspecting product data for quality issues. In response, the batch processing engine 114 may: (i) retrieve product records from the batch data 116, (ii) process the records using the native filtering routine to remove any incomplete entries, (iii) query the rule database 108 to retrieve product specification rules, (iv) process the product records with complete data using the retrieved product specification rules to determine product records with complete data that satisfy the retrieved product specification rules, and (v) product records with complete data that satisfy the retrieved product specification rules using a processing routine (e.g., a native processing routine or a custom processing routine that makes a call to the native processing routine and/or to the rule database 108) to determine a processing output, and (vi) provide the processing output to the destination system 106. In some cases, the batch processing engine 114 may store an indication of product records with incomplete data and/or product records that fail to satisfy the retrieved product specification rules on the log database 118.

As described above, in some cases, the batch processing engine 114 stores at least a subset of data records that do not satisfy the requirements associated with a filtering routine (e.g., a custom filtering routine that makes a call to the native filtering routine and/or to the rule database 108) on the log database 118. In some cases, processing a set of data records using a filtering routine causes determination of at least two subsets of the data records: a selected subset and a filtered subset. The selected subset may refer to a subset of the retrieved data records that satisfy the requirements of the filtering routine (e.g., and are thus provided as input data to a subsequently-executed processing routine). The filtered subset may refer to a subset of the retrieved data records that fail to satisfy requirements of the filtering routine (e.g., and are thus not provided as input data to a subsequently-executed processing routine). In some cases, the batch processing engine 114 stores at least a subset of the filtered subset on the log database 118.

For example, given a custom filtering routine that first makes a call to a native filtering routine and then applies a set of filtering rules retrieved from the rule database 108, the batch processing engine 114 may store an indication of at least one of the following on the log database 118: (i) the set of data records processed by the native filtering routine that fail to satisfy the requirements of the native filtering routine and are thus not processed using the additional filtering rules retrieved from the rule database, (ii) the set of data processed using the additional filtering rules that fail to satisfy the requirements of the additional filtering rules and are thus not processed using the subsequently-executed processing routine. In some cases, after an indication of a data record is stored on the log database 118, the log database 118 maintains the indication until a terminating condition is reached (e.g., for a defined period of time after creation of the data record and/or addition of the indication to the log database 118; until an expiration time, such as a policy termination time, associated with the data record; and/or the like).

In some cases, one objective behind storing data records that fail to satisfy the filtering rules extracted from the rule database 108 on the log database 118 is to process the filtered data records in the event that the set of relevant filtering rules stored on the rule database 108 change. For example, consider an example scenario in which, at a first time, a custom filtering routine: (i) retrieves a first set of data records from the batch data 116, (ii) processes the first set using a native filtering routine to determine a second set of data records as a subset of the first set, (iii) retrieves a set of filtering rules from the rule database 108, (iv) processes the second set using the set of filtering rules to determine a third set of data records as a subset of the second set that satisfy the filtering rules, and (v) stores an indication of a fourth set of data records including a subset of the second set that fail to satisfy the filtering rules on the log database 118. If, at a second time, the batch processing engine 114 receives an indication that the set of filtering rules stored on the rule database 108 has been modified (e.g., a new filtering rule has been added to the set of relevant filtering rules stored on the rule database 108), the batch processing engine 114 may retrieve the fourth set based on the indication stored on the log database 118, apply the modified set of filtering rules to determine whether each data record in the fourth set satisfies the set of filtering rules as modified, and then processes those data records in the fourth set that satisfy the modified filtering rules using a processing routine.

In one example, at a first time, the batch processing engine 114 processes a set of four data records R1-R4 using a filtering rule that requires selecting only those data records whose relevant jurisdiction is J1, where the relevance of J1 may be determined based on data queried from the rule database 108, such as by applying rules retrieved from the rule database 108 to J1 to determine whether J1 satisfies those rules. In this example, the batch processing engine 114 may determine that R1 and R4 are associated with J1, R2 is associated with a jurisdiction J2, and R3 is associated with a jurisdiction J3. Based on these determinations, the batch processing engine 114 may, at the first time, filter out R2 and R3 that are not associated with J2. Given this determination, the batch processing engine 114 may process R1 and R4 using the processing routine and store an indication of R2 and R3 on the log database 118. However, at a second time, the batch processing engine 114 may detect that (e.g., receive an indication representing that) the data stored on the rule database 108 has been updated to add that the set of relevant jurisdictions includes J1 and J2. Based on this detection, the batch processing engine 114 may, at the second time, retrieve R2 and R3 based on the indications stored on the log database 118 to determine whether each of those records is associated with at least one of the updated relevant jurisdictions includes J1 and J2. At this time, the batch processing engine 114 may determine that R2 is associated with J2 and thus process R2 using the processing routine.

In some cases, the log database 118 stores an indication of which data records satisfy the requirements of the filtering rules extracted from the rule database 108 and which data records fail to satisfy the requirements of the filtering rules. In some cases, the batch processing engine 114 may (e.g., triggered periodically and/or based on determining a change to the filtering rules stored on the rule database 108) process both sets of data records using the updated filtering rules to determine: (i) which data records that previously satisfied the requirements of the filtering rules extracted from the rule database 108 no longer do so, and (ii) which data records that previously did not satisfy the requirements of the filtering rules extracted from the rule database 108 now satisfy those requirements. The batch processing engine 114 may then remove data determined based on the output of processing the set (i) using the processing routine, and/or process the set (ii) using the processing routine to determine additional output data.

Accordingly, as described above, environment 100 enables performing batch processing using customized operational logic that makes a query to a decoupled database containing one or more operational rules. In some cases, the developer system 104 may update the configuration data 112 using the configuration interfaced 110 to override a native filtering routine with a custom filtering routine that: (i) makes a call to a native filtering routine, (ii) makes a call to the rule database 108 to determine a set of filtering rules, (iii) processes the output of the native filtering routine using the set of filtering rules to determine a filtered set, and (iv) processes the filtered set using a processing routine to determine a processing output. As a result, the batch processing engine 114 may: (i) receive, from the destination system 106, a request to perform a batch processing workflow that includes the custom filtering routine and the processing routine, (ii) determine a selected set and a filtered set of data records by performing the operations associated with the custom filtering routine including making a call to the rule database 108, (iii) process the selected set using the processing routine to determine a processing output, (iv) provide the processing output to the destination system 106, and (v) store an indication of the filtered set on the log database 118. In some cases, at a second time, the batch processing engine 114 may: (i) detect an update to the filtering rules stored on the rule database 108, (ii) retrieve the filtered data records based on the indication(s) stored on the log database 118, (iii) process the filtered data records using the updated rules to determine which filtered data records satisfy the updated rules, (iv) process the filtered data records that satisfy the updated rules using the processing routine to determine a processing output, and (v) provide the processing output to the destination system 106.

In some cases, the techniques described herein improve the computational efficiency of performing updates and/or maintenance on a batch processing system by reducing the need for removing the need to update the codebase of the batch processing system and/or deploy the updated codebase on the batch processing system. As described above, in some cases, the techniques described herein enable overriding a native batch processing routine (e.g., a native filtering routine or a native processing routine) defined by the system's configuration data using a custom batch processing routine (e.g., a custom filtering routine or a custom processing routine) that makes a call to the native batch processing routine as well as to a rule database (e.g., an external rule database) that can be used to retrieve the latest version of a set of batch processing rules (e.g., filtering rules or processing rules). This architecture decouples the rule identification framework from the codebase of the custom batch processing routine, such that a developer can update the filtering rules (e.g., by adding new rules, removing existing rules, and/or modifying existing rules) without changing the codebase of the configuration data and/or deploying the updated codebase onto the configuration data. For example, the developer may be able to update the behavior of the custom filtering routine without the need to change the respective codebase of the custom filtering routine and/or without the need to deploy updated codebase onto the configuration data of the batch processing system. Accordingly, the techniques described herein may reduce the computational requirements associated with updating and/or maintenance of the batch processing system.

Figure 2:
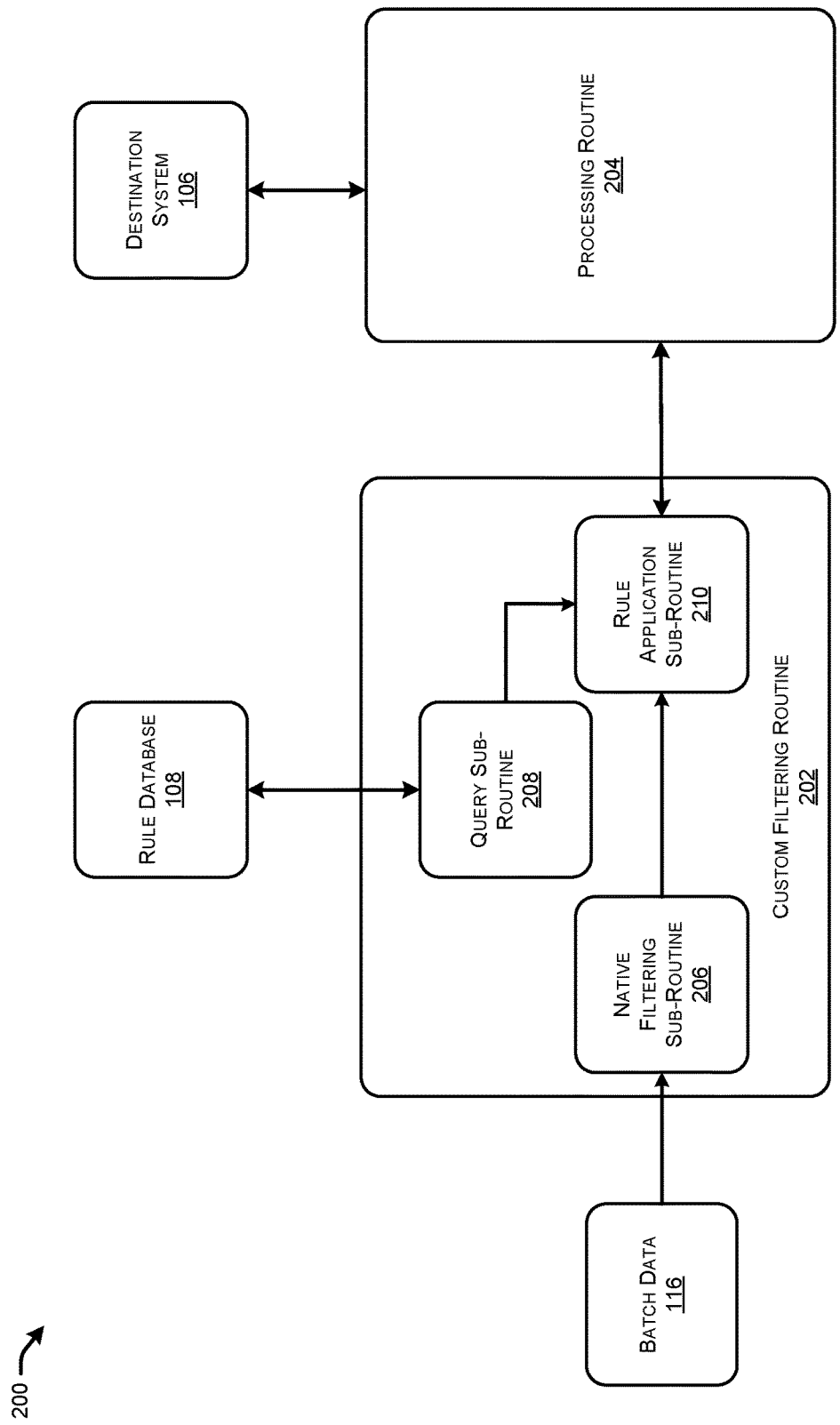
FIG. 2 provides an operational example of a batch processing workflow defined by the configuration data associated with the batch processing system.

FIG. 2 provides an operational example of a batch processing workflow 200 defined by the configuration data 112 associated with the batch processing system 102. As depicted in FIG. 2, the batch processing workflow 200 includes a custom filtering routine 202 and a processing routine 204. The custom filtering routine 202 may be configured to perform one or more filtering operations on data received from the batch data 116 to determine a filtered subset that is then provided to the processing routine 204. The custom filtering routine 202 may be defined by: (i) implementing an interface data structure that defines a routine signature for a filtering routine, or (ii) inheriting from a class data structure (e.g., an abstract class data structure, such as an abstract class data structure that implements an interface data structure) that defines a native filtering routine and overriding the native filtering routine.

As depicted in FIG. 2, the custom filtering routine 202 includes a native filtering sub-routine 206, a query sub-routine 208, and a rule application sub-routine 210. The native filtering sub-routine 206 may be configured to: (i) receive at least a subset of the batch data 116, (ii) call the native filtering routine while providing the received batch data 116 as an input to the native filtering routine (e.g., using one or more parameters and/or an in-scope data loading operation associated with the native filtering routine, (iii) receive the output of the native filtering routine, and (iv) provide the output of the native filtering routine to the rule application sub-routine 210. In some cases, if the custom filtering routine 202 is in a class that inherits from a class that includes the native filtering routine, the native filtering sub-routine 206 includes a keyword used to call a routine from a super-class, such as the super keyword.

As further depicted in FIG. 2, the query sub-routine 208 is configured to make a query to the rule database 108. The query may be configured to retrieve one or more filtering rules. The filtering rules may be associated with the batch processing workflow 200. In some cases, the query performed by the query sub-routine 208 enables the custom filtering routine 202 to decouple rule identification from rule application, which in turn enables a developer to modify the operational logic of the custom filtering routine 202 without changing the codebase associated with the custom filtering routine. For example, the developer may add one or more rules to, remove one or more rules from, and/or modify one or more rules in the rule database 108 and thus modify the operational logic of the custom filtering routine 202, without changing the underlying code associated with the custom filtering routine 202 (e.g., without changing the code associated with the native filtering sub-routine 206, the query sub-routine 208, and the rule application sub-routine 210). The query sub-routine 208 provides the rules extracted from the rule database 108 to the rule application sub-routine 210.

As further depicted in FIG. 2, the rule application sub-routine 210 is configured to process the output data of the native filtering sub-routine 206 based on the rules extracted by the query sub-routine 208 to determine a filtered set of data records. In some cases, the rule application sub-routine 210 determines which data records provided by the native filtering sub-routine 206 satisfy the requirements defined by the extracted rules and provides those satisfactory data records to the processing routine 204. However, because the rule application sub-routine 210 is defined based on a variable set of rules, changing the extracted rules may not necessitate changing the codebase of the rule application sub-routine 210. Accordingly, in some cases, a developer may add one or more rules to, remove one or more rules from, and/or modify one or more rules in the rule database 108 and thus modify the operational logic of the rule application sub-routine 210 without changing the underlying code associated with the rule application sub-routine 210. The rule application sub-routine 210 provides the filtered records to the processing routine 204 to perform one or more processing operations on those filtered records and provide the processing output to a destination system 106.

Accordingly, the custom filtering routine 202 depicted in FIG. 2 is defined based on a set of rules extracted from the rule database 108 and using the query sub-routine 208. Specifically, after the query sub-routine 208 extracts a set of filtering rules from the rule database 108, the rule application sub-routine 210 applies those rules to data records generated by calling the native filtering routine using the native filtering sub-routine 206. This arrangement enables a developer to change the rule set included in the rule database 108 and thus modify the operational logic of the custom filtering routine 202, without changing the underlying code associated with the custom filtering routine 202 (e.g., without changing the code associated with the native filtering sub-routine 206, the query sub-routine 208, and the rule application sub-routine 210).

Figure 3:
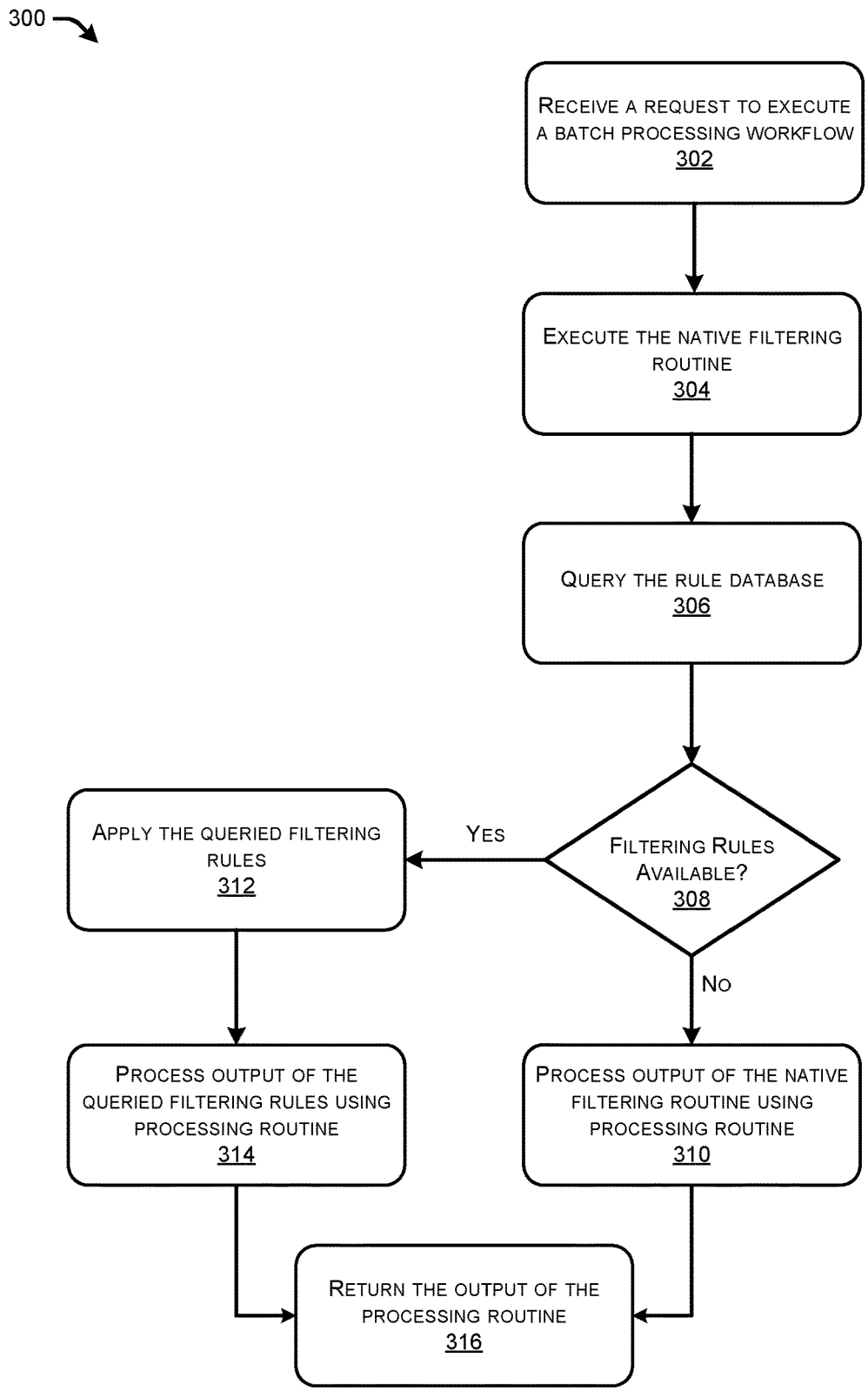
FIG. 3 is a flowchart diagram of an example process for performing operations of a batch processing workflow that is associated with a custom filtering routine and a native processing routine.

FIG. 3 is a flowchart diagram of an example process 300 for performing operations of a batch processing workflow that is associated with a custom filtering routine and a native processing routine. As depicted in FIG. 3, at operation 302, the batch processing engine 114 receives a request to execute the batch processing workflow from a destination system 106. The destination system 106 may, for example, be a client device.

At operation 304, the batch processing engine 114 executes a native filtering routine. The native filtering routine may be a filtering routine defined by the configuration data 112 associated with the batch processing system 102 before any modifications to the configuration data 112 by a developer system 104. In some cases, the native filtering routine is configured to perform at least one of the following operations: (i) retrieving at least a portion of data records stored in the batch data 116, or (ii) performing one or more operations on data records stored in the batch data 116. In some cases, the native filtering routine includes one or more default data engineering, data cleansing, data formatting, and/or data processing operations performed by the batch processing system 102 for all data records and/or for all batch processing workflows.

At operation 306, the batch processing engine 114 queries the rule database 108 to determine whether the rule database 108 includes any filtering rules associated with the batch processing workflow. In some cases, querying the rule database 108 includes providing an identifier associated with the batch processing workflow (e.g., an eighth batch processing workflow). In response to the query, the rule database 108 may provide zero or more filtering rules associated with the identifier.

At operation 308, the batch processing engine 114 determines whether the rule database 108 returned any filtering rules in response to the query. If the rule database 108 did not return any filtering rules (operation 308—No), the batch processing engine 114 proceeds to operation 310 to process the output of the native filtering routine using a processing routine (e.g., a native processing routine) to determine a processing output. In some cases, if the rule database 108 does not include any filtering rules reserved for the batch processing workflow, the batch processing engine 114 does not need to perform any customized operations beyond the operations associated with the native filtering routine.

However, if the rule database 108 returned one or more filtering rules in response to the query (operation 310—Yes), the batch processing engine 114 proceeds to operation 312 to apply the filtering rules to the output of the native filtering routine. The filtering rules may be used to determine which of the data records returned by the native filtering routine satisfy the filtering rules returned by querying the rule database 108. The satisfying data records may then be provided as an input to the processing routine.

At operation 314, the batch processing engine 114 processes the filtered subset returned by operation 312 using the processing routine (e.g., the native processing routine) to determine a processing output, for example by filtering the filtered subset in accordance with a set of procedures for modifying data. In some cases, if the rule database 108 returns one or more filtering rules, the batch processing engine 114 applies those rules to the data records before processing the surviving data records using the processing routine.

At operation 316, the batch processing engine 114 returns the output of the processing routine as the processing output to the destination system 106. In some cases, the processing output indicates the result of performing a defined set of processing operations (e.g., a defined set of compliance verification operations, a defined set of targeted communication operations, and/or the like) with respect to the data records returned by the native filtering routine and/or by applying the filtering rules returned by the rule database 108.

Accordingly, the process 300 enables performing a sequence of filtering operations followed by processing operations on batch data based on filtering rules extracted from the rule database 108. In this manner, the process 300 decouples the rule identification framework used to determine filtering rules from the codebase of the custom batch processing routine, such that a developer can update the filtering rules (e.g., by adding new rules, removing existing rules, and/or modifying existing rules) without changing the codebase of the configuration data and/or deploying the updated codebase onto the configuration data. For example, the developer may be able to update the behavior of the custom filtering routine without the need to change the respective codebase of the custom filtering routine and/or without the need to deploy updated codebase onto the configuration data of the batch processing system.

Figure 4:
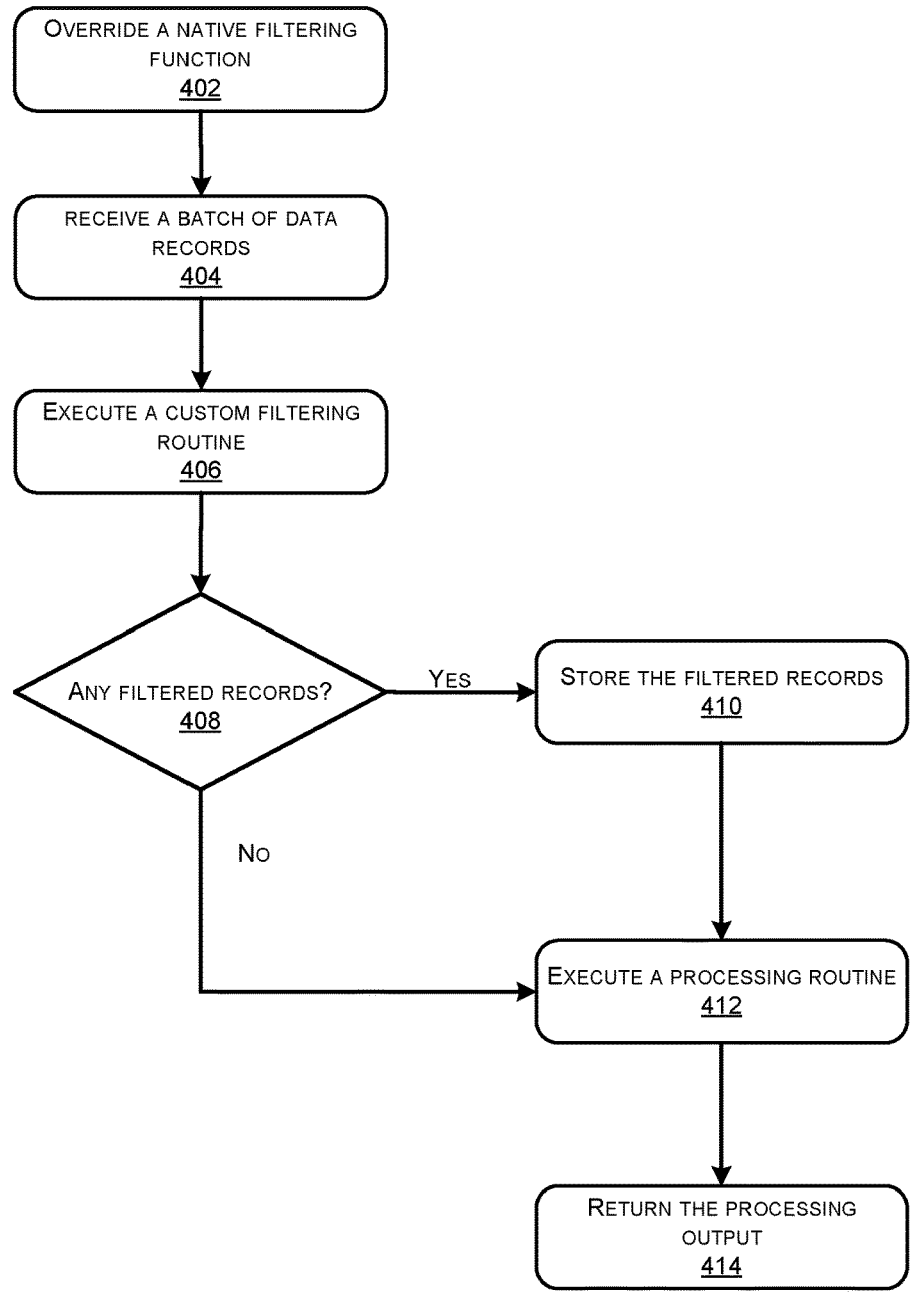
FIG. 4 is a flowchart diagram of an example process for processing a batch of data using a custom filtering routine.

FIG. 4 is a flowchart diagram of an example process 400 for processing a batch of data using a custom filtering routine. As depicted in FIG. 4, at operation 402, the configuration interface 110 overrides a native filtering routine defined by the configuration data 112 to define a custom filtering routine. In some cases, to override the native filtering routine with a custom filtering routine, the configuration interface 110 may (e.g., based on data received from the developer system 104) modify the configuration data 112 to define a subclass data structure that inherits a class data structure (e.g., an abstract class data structure) with the native filtering routine. The subclass data structure may override the native filtering routine with the custom filtering routine. The custom filtering routine may be configured to: (i) receive at least a subset of the batch data 116, (ii) call the native filtering routine (e.g., using the super keyword) to process the received batch data 116, and (iii) apply one or more additional filtering operations on the output of the native filtering routine.

In some cases, to override the native filtering routine with a custom filtering routine, the configuration interface 110 may (e.g., based on data received from the developer system 104) modify the configuration data 112 to define a class data structure that implements an interface data structure. The interface data structure may define a first routine signature that is implemented via another class data structure, where the other class data structure may implement the first routine signature using the native filtering routine. The class data structure may implement the first routine signature using the custom filtering routine. The custom filtering routine may be configured to: (i) receive at least a subset of the batch data 116, (ii) call the native filtering routine (e.g., using the super keyword) to process the received batch data 116, and (iii) apply one or more additional filtering operations on the output of the native filtering routine.

At operation 404, the batch processing engine 114 receives a batch of data records from the batch data 116. For example, the batch processing engine 114 may receive a request to perform a batch processing workflow associated with a set of data records from the destination system 106. The batch processing engine 114 may, in response to the request, retrieve the data records associated with the batch processing workflow from the batch data 116. The batch processing engine 114 may, for example, retrieve the data records associated with the batch processing workflow from the batch data 116 by communicating with an application programming interface (API) associated with the database storing the batch data 116.

At operation 406, the batch processing engine 114 executes operations associated with the custom filtering routine on the batch of data records to determine a selected subset of the data records. The custom filtering routine may be configured to: (i) receive the batch of data records, (ii) call the native filtering routine (e.g., using the super keyword) to process the batch of data records, and (iii) apply one or more additional filtering operations on the output of the native filtering routine. For example, the custom filtering routine may be configured to: (i) make a query to the rule database 108 to extract one or more filtering rules, and (ii) apply the extracted filtering rules to the output of the native filtering routine to perform the additional filtering operations.

At operation 408, the batch processing engine 114 determines whether the execution of custom filtering routine caused filtering at least one data record out of the batch of data records. In some cases, a data record is filtered out of the batch if the data record fails to satisfy at least one filtering requirement associated with the custom filtering routine. For example, a data record is filtered out of the batch if the data record fails to satisfy at least one filtering requirement defined by the operational logic of the native filtering routine called by the custom filtering routine. As another example, a data record is filtered out of the batch if the data record fails to satisfy at least one filtering requirement defined by a filtering rule extracted by querying the rule database 108.

If the batch processing engine 114 determines that the execution of custom filtering routine caused filtering at least one data record out of the batch of data records (operation 408—Yes), the batch processing engine 114 proceeds to operation 408 to store the filtered data records on the log database 118. As described above, storing the filtered data records on the log database 118 enables processing those filtered data records using updated sets of filtering rules in the event of updates to the filtering rules stored on the rule database 108. After operation 410, the batch processing engine proceeds to operation 410. If the batch processing engine 114 determines that the execution of custom filtering routine did not cause any data records in the batch to be filtered out (operation 408—No), the batch processing engine 114 also proceeds to operation 410.

At operation 412, the batch processing engine 114 executes a processing routine on the data records returned by the custom filtering routine. The processing routine may be a native processing routine or a custom processing routine. The custom processing routine may be configured to: (i) receive input data including the output of the custom filtering routine, (ii) call the native processing routine to process the received input, and (iii) apply one or more additional processing operations on the output of the native processing routine. For example, the custom filtering routine may be configured to: (i) make a query to the rule database 108 to extract one or more processing rules, and (ii) apply the extracted filtering processing to the output of the native processing routine to perform the additional processing operations.

At operation 414, the batch processing engine 114 returns the output of the processing performed by the processing routine. For example, the processing output may include the result of processing the data records processed by the native processing routine as well as any additional outputs generated by the custom processing routine. As another example, the processing output may include one or more notifications (e.g., error logs, maintenance logs, administrative review notifications, and/or the like) determined based on the processing of the data records processed by the native processing routine.

In some cases, the processing output is returned to the destination system 106 which originally requested execution of the batch processing workflow. For example, the destination system 106 may be an analytics platform that requested analysis of a dataset, and the processing output may contain aggregated metrics on the dataset. In some cases, the processing output may be stored on a database for later analytics processing and/or query processing. The processing routine may perform one or more operations on the filtered data. Examples of processing operations include statistical analysis operations, natural language processing operations, machine learning operations, data visualization operations, report generation operations, search indexing operations, and compliance verification operations.

Accordingly, the process 400 enables defining and executing operations associated with a custom filtering routine defined by filtering rules extracted from a rule database 108 and storing the data records that fail those filtering rules on the log database 118. In some cases, one objective behind storing data records that fail to satisfy the filtering rules extracted from the rule database 108 on the log database 118 is to process the filtered data records in the event that the set of relevant filtering rules stored on the rule database 108 change. By storing filtered records that failed previous versions of the rules, the system provides the ability to "go back" and re-evaluate those filtered records against new rule sets. This avoids having to completely re-ingest source batch data, improving efficiency and ensuring historical data gets properly evaluated relative to current filtering requirements (e.g., regulations). The log database 118 may thus store a historical repository of filtered records that can be reprocessed through evolving filter logic as needed.

Figure 5:
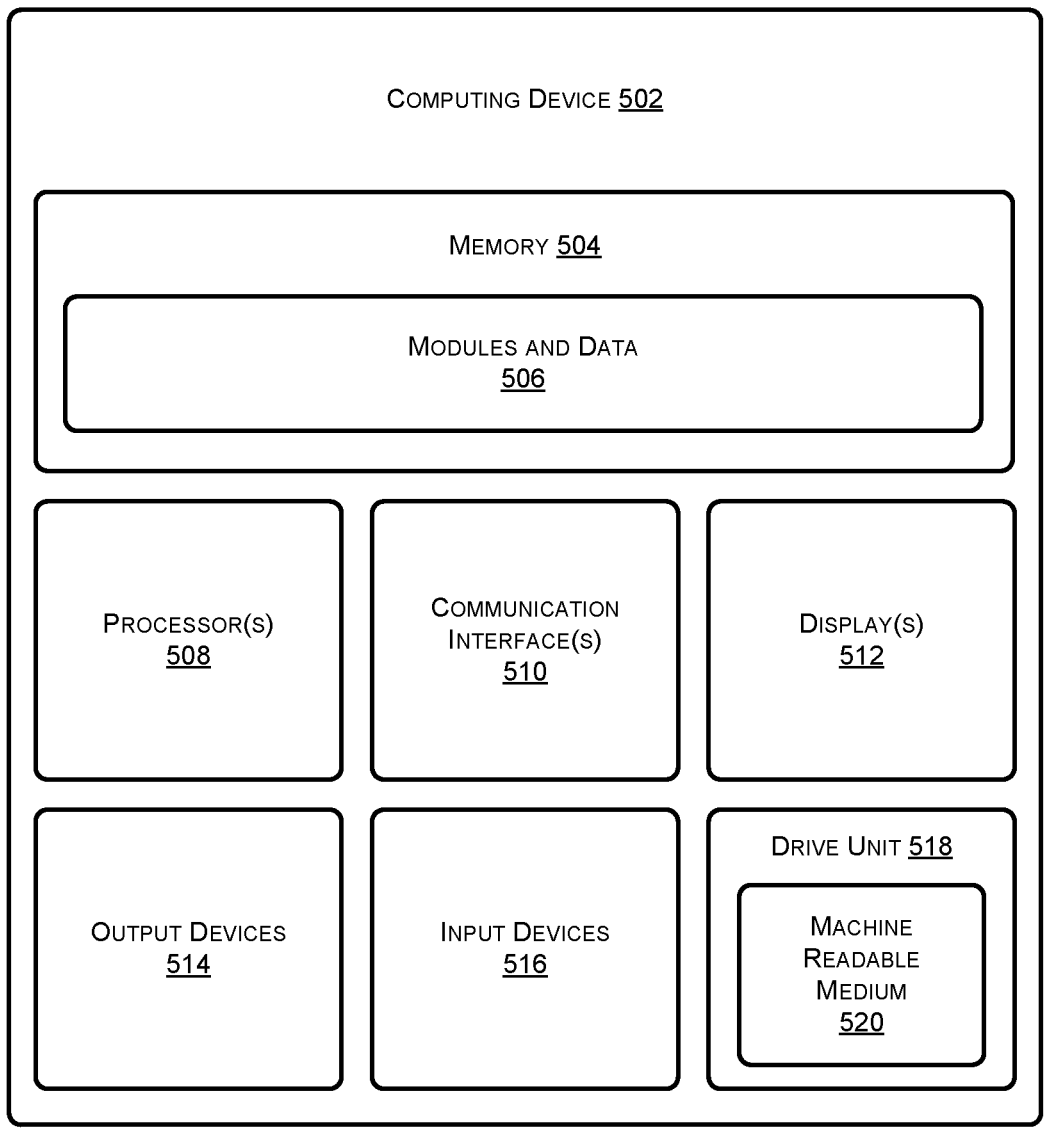
FIG. 5 shows an example system architecture for a computing device associated with the environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
  at a first time, receiving, by a processor, a first request to update configuration data defining a batch processing workflow of a batch processing system, wherein the configuration data requires processing a first output of a first filtering routine using a first processing routine;
  based on receiving the first request, updating, by the processor, the configuration data to override the first filtering routine with a second filtering routine that is configured to:
    intercept a first input of the first filtering routine,
    provide the first input to the first filtering routine,
    receive, from the first filtering routine, the first output of the first filtering routine;
    receive, from a first database that is external to the batch processing system, a filtering rule, and
    determine a second output of the second filtering routine based on a applying the filtering rule to the first output;
  at a second time, receiving, by the processor, a second request to execute the batch processing workflow;

based on receiving the second request, providing, by the processor, a first dataset stored on a second database as the first input to the second filtering routine;
receiving, by the processor and from the second filtering routine, a second dataset stored on the second database as the second output;
executing, by the processor, the first processing routine on the second dataset to determine a batch processing result data of the first processing routine; and
updating, by the processor, the second database based on the batch processing result data.

2. The method of claim 1, wherein:
the configuration data comprises a first interface data structure and a first class data structure implementing the first interface data structure,
the first interface data structure comprises a first routine signature and a second routine signature,
the first class data structure implements the first routine signature using the first filtering routine, and implements the second routine signature using the first processing routine,
overriding the first filtering routine comprises implementing the first interface data structure using a second class data structure, and
the second class data structure implements the first routine signature using the second filtering routine and the second routine signature using the first processing routine.

3. The method of claim 2, wherein:
the configuration data comprises a first interface data structure and a first class data structure implementing the first interface data structure,
the first interface data structure comprises a first routine signature and a second routine signature,
the first class data structure implements the first routine signature using the first filtering routine and the second routine signature using the first processing routine, and
overriding the first filtering routine comprises defining a second class data structure that inherits from the first class data structure and overrides the first filtering routine with the second filtering routine.

4. The method of claim 1, further comprising:
based on receiving the first request, updating the configuration data to override the first processing routine with a second processing routine that is configured to:
intercept a second input of the first processing routine,
provide the second input to the first processing routine,
receive, from the first processing routine, a third output of the first processing routine,
receive, from a third database that is external to the batch processing system, a processing rule, and
determine a fourth output of the second processing routine based on applying the processing rule to the third output.

5. The method of claim 4, wherein executing the first processing routine comprises:
providing the second dataset as the second input to the second processing routine; and
receiving, from the second processing routine, the batch processing result data as the fourth output of the second processing routine.

6. The method of claim 1, further comprising:
at the second time, determining, by the processor, that a first data record of the first dataset fails to satisfy the filtering rule and storing a first indication of the first data record; and
at a third time, receiving, by the processor from the first database, a second indication that the filtering rule has been removed from the first database, and
determining, based on the first indication and the second indication, to execute the second filtering routine on the first data record.

7. The method of claim 6, wherein the third time is triggered by receiving a third indication of an update to the first database.

8. The method of claim 6, wherein the third time is triggered periodically.

9. The method of claim 6, further comprising:
executing, by the processor, the first processing routine based on the first data record to determine a second data record, and
updating, by the processor, the second database based on the second data record.

10. The method of claim 6, wherein the first indication is stored in a log database that is internal to the batch processing system.

11. A computing system, comprising:
a processor; and
memory storing computer-executable instructions that, when executed by the processor, cause the computing system to perform operations comprising:
at a first time, receiving a first request to update configuration data defining a batch processing workflow of a batch processing system, wherein the configuration data requires processing a first output of a first filtering routine using a first processing routine;
based on receiving the first request, updating the configuration data to override the first filtering routine with a second filtering routine that is configured to:
intercept a first input of the first filtering routine,
provide the first input to the first filtering routine,
receive, from the first filtering routine, the first output of the first filtering routine;
receive, from a first database that is external to the batch processing system, a filtering rule, and determine a second output of the second filtering routine based on a applying the filtering rule to the first output;
at a second time, receiving a second request to execute the batch processing workflow;
based on receiving the second request, providing a first dataset stored on a second database as the first input to the second filtering routine;
receiving, from the second filtering routine, a second dataset stored on the second database as the second output;
executing the first processing routine on the second dataset to determine a batch processing result data of the first processing routine; and
updating the second database based on the batch processing result data.

12. The computing system of claim 11, wherein:
the configuration data comprises a first interface data structure and a first class data structure implementing the first interface data structure,
the first interface data structure comprises a first routine signature and a second routine signature,
the first class data structure implements the first routine signature using the first filtering routine, and implements the second routine signature using the first processing routine,
overriding the first filtering routine comprises implementing the first interface data structure using a second class data structure, and the second class data structure implements the first routine signature using the second filtering routine and the second routine signature using the first processing routine.

13. The computing system of claim 12, wherein:
the configuration data comprises a first interface data structure and a first class data structure implementing the first interface data structure,
the first interface data structure comprises a first routine signature and a second routine signature,
the first class data structure implements the first routine signature using the first filtering routine and the second routine signature using the first processing routine, and
overriding the first filtering routine comprises defining a second class data structure that inherits from the first class data structure and overrides the first filtering routine with the second filtering routine.

14. The computing system of claim 11, the operations further comprising:
based on receiving the first request, updating the configuration data to override the first processing routine with a second processing routine that is configured to:
intercept a second input of the first processing routine,
provide the second input to the first processing routine,
receive, from the first processing routine, a third output of the first processing routine,
receive, from a third database that is external to the batch processing system, a processing rule, and
determine a fourth output of the second processing routine based on applying the processing rule to the third output.

15. The computing system of claim 14, wherein executing the first processing routine comprises:
providing the second dataset as the second input to the second processing routine; and
receiving, from the second processing routine, the batch processing result data as the fourth output of the second processing routine.

16. One or more non-transitory computer-readable media storing computer-executable instructions that, when executed by a processor, cause the processor to perform operations, comprising:
at a first time, receiving a first request to update configuration data defining a batch processing workflow of a batch processing system, wherein the configuration data requires processing a first output of a first filtering routine using a first processing routine;
based on receiving the first request, updating the configuration data to override the first filtering routine with a second filtering routine that is configured to:
intercept a first input of the first filtering routine,
provide the first input to the first filtering routine,
receive, from the first filtering routine, the first output of the first filtering routine;
receive, from a first database that is external to the batch processing system, a filtering rule, and determine a second output of the second filtering routine based on a applying the filtering rule to the first output;
at a second time, receiving a second request to execute the batch processing workflow;
based on receiving the second request, providing a first dataset stored on a second database as the first input to the second filtering routine;
receiving, from the second filtering routine, a second dataset stored on the second database as the second output;
executing the first processing routine on the second dataset to determine a batch processing result data of the first processing routine; and
updating the second database based on the batch processing result data.

17. The one or more non-transitory computer-readable media of claim 16, wherein:
the configuration data comprises a first interface data structure and a first class data structure implementing the first interface data structure,
the first interface data structure comprises a first routine signature and a second routine signature,
the first class data structure implements the first routine signature using the first filtering routine, and implements the second routine signature using the first processing routine,
overriding the first filtering routine comprises implementing the first interface data structure using a second class data structure, and
the second class data structure implements the first routine signature using the second filtering routine and the second routine signature using the first processing routine.

18. The one or more non-transitory computer-readable media of claim 17, wherein:
the configuration data comprises a first interface data structure and a first class data structure implementing the first interface data structure,
the first interface data structure comprises a first routine signature and a second routine signature,
the first class data structure implements the first routine signature using the first filtering routine and the second routine signature using the first processing routine, and
overriding the first filtering routine comprises defining a second class data structure that inherits from the first class data structure and overrides the first filtering routine with the second filtering routine.

19. The one or more non-transitory computer-readable media of claim 16, the operations further comprising:
based on receiving the first request, updating the configuration data to override the first processing routine with a second processing routine that is configured to:
intercept a second input of the first processing routine,
provide the second input to the first processing routine,
receive, from the first processing routine, a third output of the first processing routine,
receive, from a third database that is external to the batch processing system, a processing rule, and
determine a fourth output of the second processing routine based on applying the processing rule to the third output.

20. The one or more non-transitory computer-readable media of claim 19, wherein executing the first processing routine comprises:
providing the second dataset as the second input to the second processing routine; and
receiving, from the second processing routine, the batch processing result data as the fourth output of the second processing routine.

* * * * *